(12) United States Patent
Laurita (10) Patent No.: US 8,810,382 B1
(45) Date of Patent: Aug. 19, 2014

(54) METHOD AND APPARATUS FOR WARNING VEHICLE OF LOW OVERPASS HEIGHT

(71) Applicant: Joseph N. Laurita, Wayne, NJ (US)

(72) Inventor: Joseph N. Laurita, Wayne, NJ (US)

( * ) Notice: Subject to any disclaimer, the term of this patent is extended or adjusted under 35 U.S.C. 154(b) by 0 days.

(21) Appl. No.: 14/155,314

(22) Filed: Jan. 14, 2014

(51) Int. Cl.
   *B60Q 1/00* (2006.01)
   *B60Q 9/00* (2006.01)
   *B60Q 5/00* (2006.01)

(52) U.S. Cl.
   CPC .............. *B60Q 5/005* (2013.01); *B60Q 9/008* (2013.01)
   USPC .......................................... 340/435; 340/905

(58) Field of Classification Search
   USPC ................. 340/435, 903, 905, 573.4, 539.13, 340/552–557
   See application file for complete search history.

(56) References Cited

U.S. PATENT DOCUMENTS

| | | | |
|---|---|---|---|
| 3,899,671 A | | 8/1975 | Stover |
| 4,970,496 A | * | 11/1990 | Kirkpatrick .................. 340/435 |
| 5,282,641 A | * | 2/1994 | McLaughlin ................. 280/432 |
| 2004/0183661 A1 | * | 9/2004 | Bowman ....................... 340/435 |
| 2004/0201495 A1 | | 10/2004 | Lim et al. |
| 2006/0119473 A1 | * | 6/2006 | Gunderson et al. ........... 340/435 |
| 2008/0077327 A1 | * | 3/2008 | Harris et al. .................. 701/301 |
| 2012/0081218 A1 | * | 4/2012 | Nugent .......................... 340/435 |
| 2013/0222592 A1 | * | 8/2013 | Gieseke ....................... 348/148 |

OTHER PUBLICATIONS

GiraffeG4 Overhead Protection System, www.giraffeg4.com/technology.html ; copyright (c) 2011 GiraffeG4 Systems; Three Pages, home page and FAQs.
Motion-Sensing Door Chime/Alarm 4900426, User's Guide, Radio Shack (C) 2012 Radio Shack Corporation.

* cited by examiner

*Primary Examiner* — Thomas Mullen
(74) *Attorney, Agent, or Firm* — Walter J. Tencza, Jr.

(57) ABSTRACT

A sensor device having a top, a first side, a second side opposite the first side, a rear and a front. The sensor device may be mounted to a housing which covers the top, the first side, and the second side of the sensor device but does not cover the front of the sensor device. The housing may be adapted to be attached to an outside of a vehicle, such as by a pressure sensitive adhesive pad. The sensor device may be a motion sensor. The housing may be fixed to the vehicle near a top of the vehicle so that energy from the sensor device is emitted primarily in a direction which is parallel to a length of the vehicle, wherein the vehicle has a height and a width, and the length of the vehicle is greater than the height and the width.

17 Claims, 12 Drawing Sheets

(Prior Art)

(Prior Art)

METHOD AND APPARATUS FOR WARNING VEHICLE OF LOW OVERPASS HEIGHT

FIELD OF THE INVENTION

This invention relates to improved methods and apparatus concerning providing warnings to vehicles about low overpass heights.

BACKGROUND OF THE INVENTION

U.S. Pat. No. 3,899,671 to Stover discloses a transmitting station 10 which provides information to mobile-mounted receiving units 11 carried by vehicles. (Stover, col., 2, Ins. 1-38). The information transmitted may include information regarding turns, stop signs, signal lights, and distance to landmarks. (Id.) Stover discloses a warning symbol number of "18" in table 6 for "low clearance". (Stover, col. 16, table 6). Table 6 provides possible selection of meanings assigned to symbols for written warnings. (Stover, col. 12, Ins. 34-36). Information concerning stop signs may be displayed on display 22 so that stop signs that are difficult to see will not be missed. (Stover, col. 4, Ins. 13-26).

U.S. Pat. No. 4,621,252 to Johns discloses a radio transmitter positioned adjacent a bridge to generate radio signals encoded with the height of bridge which is presented to vehicles. (Johns, abstract). A vehicle includes a radio receiver which decodes the radio signals and the height information. (Id.) A warning signal is produced if there is a danger that the vehicle cannot pass safely. (Id.)

U.S. Published Patent Application 2004/0201495 to Lim et. al. discloses an active transmitter in the vicinity of a horizontal overhead obstacle and a receiver unit in each automobile vehicle. (Lim et al., abstract). Visual and audio warnings are produced if a vehicle will not pass underneath an overpass. (Lim, pg. 4, paragraph 46).

SUMMARY OF THE INVENTION

In at least one embodiment of the present application a sensor device is provided which has a top, a first side, a second side opposite the first side, a rear and a front. The sensor device may be mounted to a housing which covers the top, the first side, and the second side of the sensor device but does not cover the front of the sensor device. The housing may be adapted to be attached to an outside of a vehicle, such as by a pressure sensitive adhesive pad. The sensor device may be a motion sensor. The housing may be fixed to the vehicle near a top of the vehicle so that energy from the sensor device is emitted primarily in a direction which is parallel to a length of the vehicle, wherein the vehicle has a height and a width, and the length of the vehicle is greater than the height and the width.

The sensor device may be a motion sensor, and the motion sensor may be an infrared motion sensor. The sensor device may be configured to emit an audible warning when an obstacle first enters a path of the sensor device.

The apparatus may include the vehicle to which the housing the sensor device are attached. The sensor device may have a one hundred degree range. The housing may be substantially made of a hard water proof plastic.

At least one embodiment of the present invention may also include a method comprising fixing a sensor device substantially at the top of a vehicle so that energy of the sensor device is primarily directed parallel to a length of the vehicle. The sensor device may be fixed through a housing. The sensor device and the housing may have characteristics as previously described.

DETAILED DESCRIPTION OF THE DRAWINGS

Figure 1:
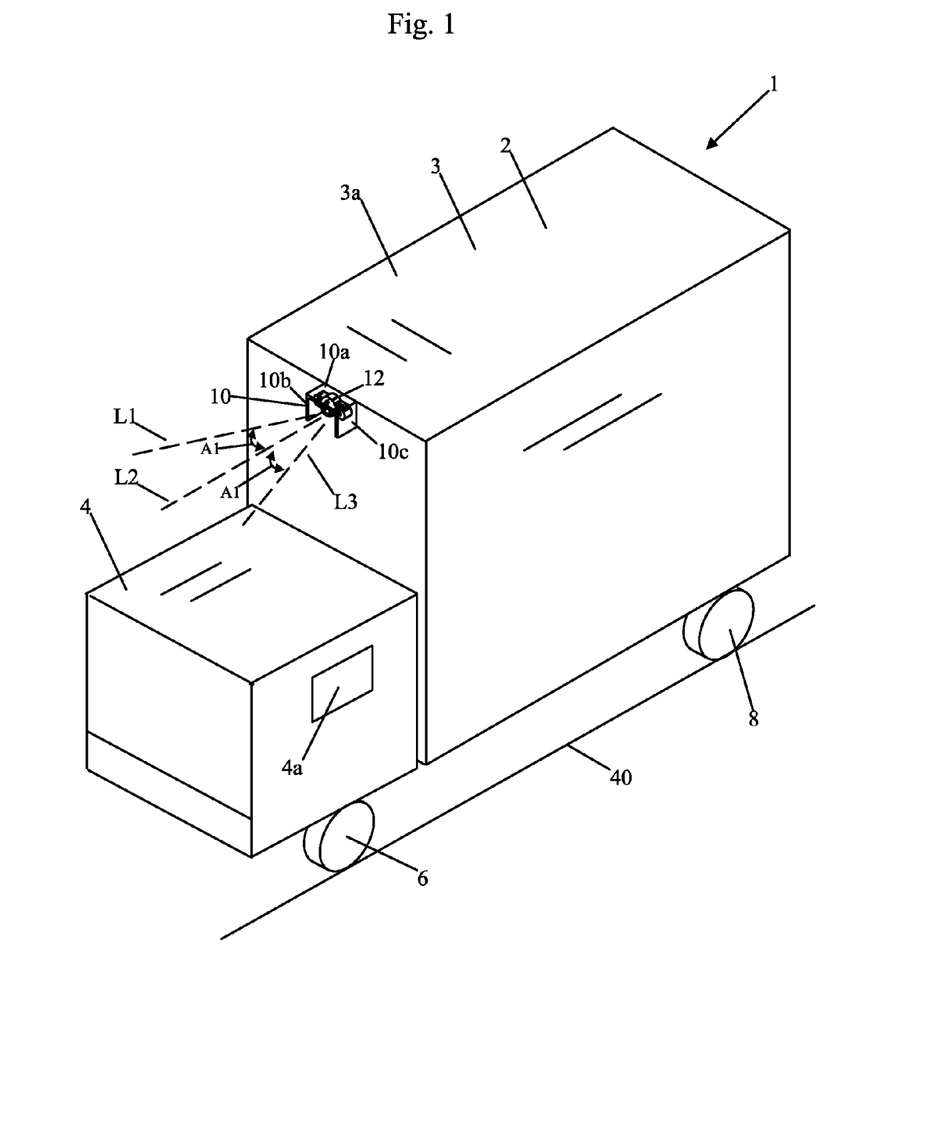
FIG. 1 shows a right, top, front perspective view of an apparatus in accordance with an embodiment of the present invention.

FIG. 1 shows a right, top, front perspective view of an apparatus 1 in accordance with an embodiment of the present invention. The apparatus 1 includes a vehicle 2, such as a truck. The vehicle 2 may include a cab portion 4 in which a driver sits, and a cargo portion, semi-trailer portion, or trailer portion 3 in which cargo is placed. The vehicle 2 may be any vehicle known, such as any known truck. The cargo portion 3 includes a top surface 3a. The vehicle 2 typically includes four wheels, including wheel 6, a wheel opposing wheel 6, but not shown in FIG. 1, wheel 8, and a wheel opposing wheel 8, not shown. The cab portion has a window 4a.

The apparatus 1 further includes a housing 10 in which is located a sensor device 12. The housing 10 is shown in FIG. 1 in a see through or transparent format so that the sensor device 12 can be seen. However, if the housing 10 is not see through, then the sensor device 12 would not be visible in the view of FIG. 1, since the sensor device 12 is covered on the top and on two sides by the housing 10. The sensor device 12 is a known sensor device typically having a one hundred degree horizontal sensing range between lines L1 and L3. The angle A1 between the line L1 and a line L2, which is a center line, is typically fifty degrees. The angle between the line L2 and a line L3 is also A1. Therefore the angle between the lines L1 and L3, representing the horizontal sensing range is one hundred degrees, or two times angle A1. In at least one embodiment sensor device 12 has a limited vertical sensing range so that it typically senses if an obstacle is at about the same height as the height of the sensor device 12, when the sensing center beam, or L2 is directed parallel to the ground surface, such as ground or road surface 40 in FIG. 1.

Figure 2:
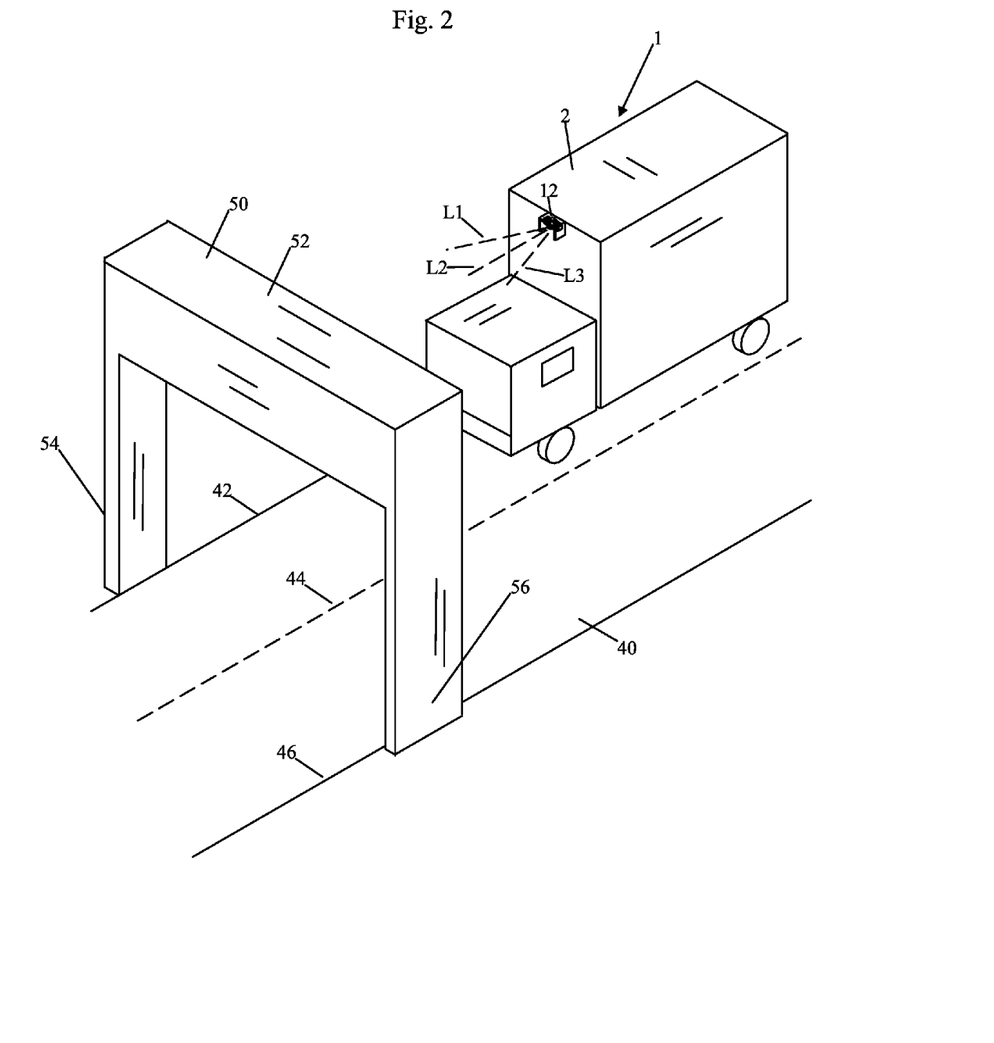
FIG. 2 shows a right, top, front perspective view of the apparatus of FIG. 1, a road, and a first structure under which vehicles having a height less than a first height can pass, wherein the apparatus is at a first location, with respect to the first structure.

FIG. 2 shows a right, top, front perspective view of the apparatus 1 of FIG. 1, the road surface 40, and a first structure 50 under which vehicles having a height less than a first height can pass, wherein the apparatus 1 is at a first location, with respect to the first structure 50. The road or road surface 40 includes a boundary 42, a center dashed line 44, and a boundary 46. The first structure 50 includes a horizontal beam 52, and vertical columns or beams 54 and 56. The first structure 50 may represent an underpass or overpass for a bridge or for a train or an automobile road traversing over horizontal beam 52. The apparatus 1 is shown in FIG. 2 on one side of the center dashed line 44 travelling towards the first structure 50.

Figure 3:
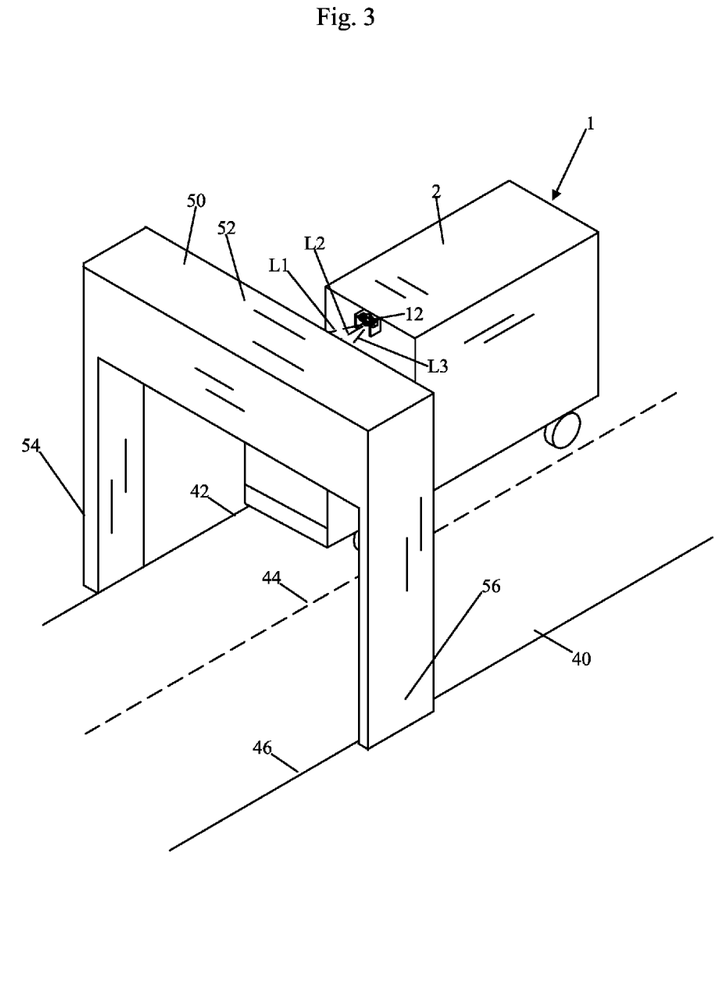
FIG. 3 shows a right, top, front perspective view of the components shown in FIG. 2, but wherein the apparatus is at a second location, with respect to the first structure.

FIG. 3 shows a right, top, front perspective view of the components shown in FIG. 2, but wherein the apparatus 1 is at a second location, with respect to the first structure 50. In operation, as the apparatus 1 approaches the first structure 50, the beam, or sensing signal from the sensor device 12 impacts with the horizontal beam 52 and is returned as a return signal to and sensed by the sensor device 12. From this return signal, the sensor device 12 senses that there is an obstacle at about the height of the sensor device 12, in front of the vehicle 2. As will be explained with reference to FIG. 11, when the sensor device 12, and particularly sensor 204 shown in FIG. 11 or sensor 12c shown in FIG. 7 senses an obstacle or object at the height of the sensor device 12, then a chime (if the sensor device 12 is set to "chime") or alarm sound (if the sensor device 12 is set to "alarm" will be emitted from a speaker of sensor device 12.

Figure 7:
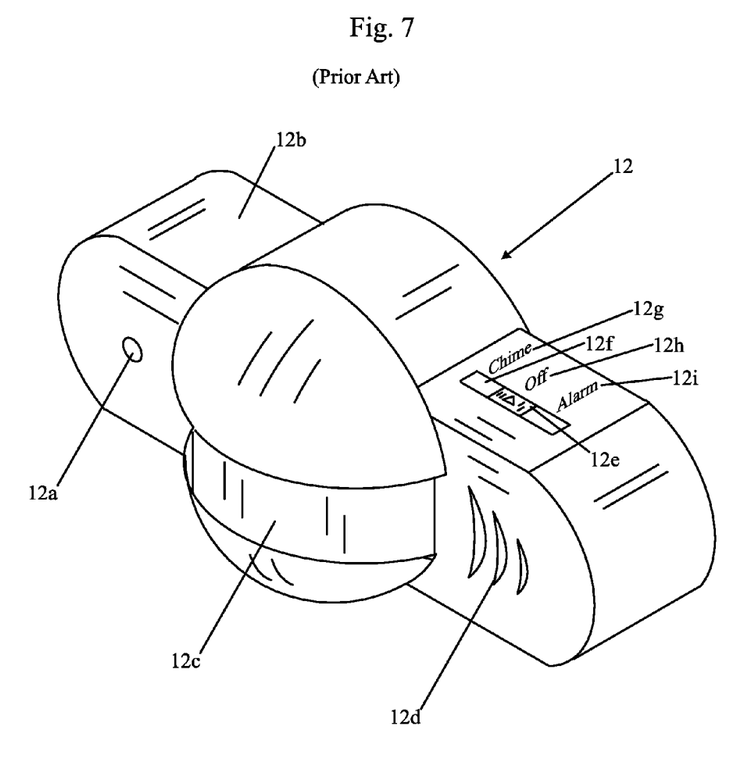
FIG. 7 shows the known sensor device, also shown in FIG. 6, for use with the apparatus of FIG. 1.
Figure 11:
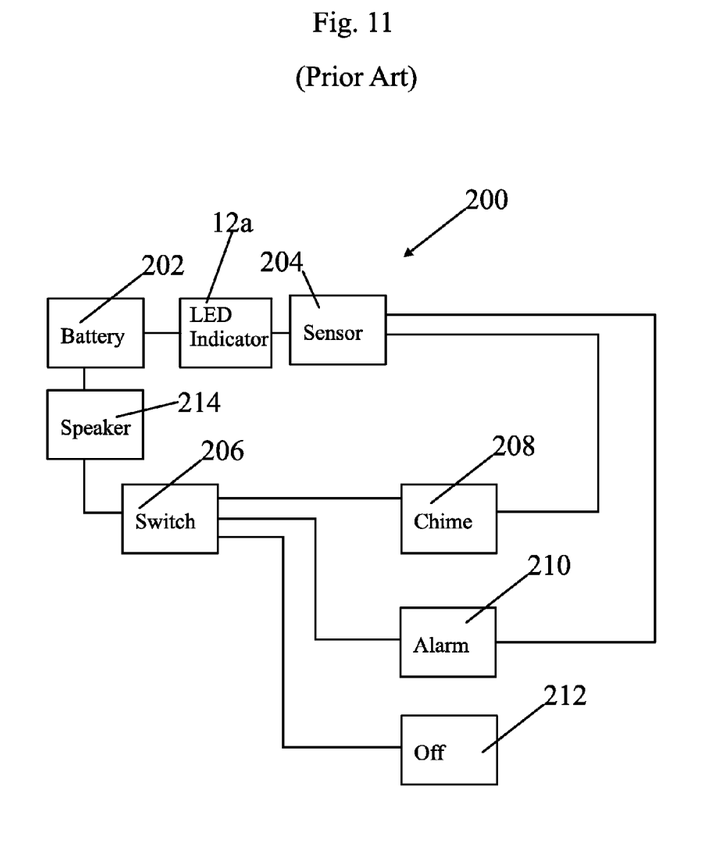
FIG. 11 shows a block circuit diagram of various components used in the known sensor device of FIG. 7.

FIG. 11 shows a block circuit diagram 200 of various components used in the known sensor device 12 of FIG. 7. The known sensor device 12 may include a battery 202, an LED indicator 12a, a sensor 204, a speaker 214, a switch 206, a chime 208, an alarm 210, and an off setting 212. The switch 206 may be a three way switch. In operation, if the switch 206 or 12e, is set to "Chime" 208 or 12g shown by FIG. 7 and FIG. 11 respectively, then a completed electrical circuit including battery 202, speaker 214, switch 206, chime 208, the sensor 204, and the LED (light emitting diode) indicator 12a is formed, in which the chime causes the speaker 214 to make a chime sound, and the LED 12a to light up, when an object is sensed by the sensor 204 or 12c in FIG. 7. If the switch 206 or 12e is set to "Alarm" 210 or 12i shown by FIG. 7 and FIG. 11, respectively, then a completed electrical circuit including battery 202, speaker 214, switch 206, alarm 210, sensor 204 (or 12c in FIG. 7), and the LED indicator 12a, is formed, in which the alarm 210 causes the speaker 214 to make an alarm sound and the LED indicator 12a lights up, when an object is sensed by the sensor 204. If the switch 206 or 12e is set to "Off" 12h or 212 shown by FIG. 7 and FIG. 11, respectively, then no completed electrical circuit is formed and no sound is emitted from the speaker 214, even if an object is directly in front of the sensor 204 or 12c.

Figure 4:
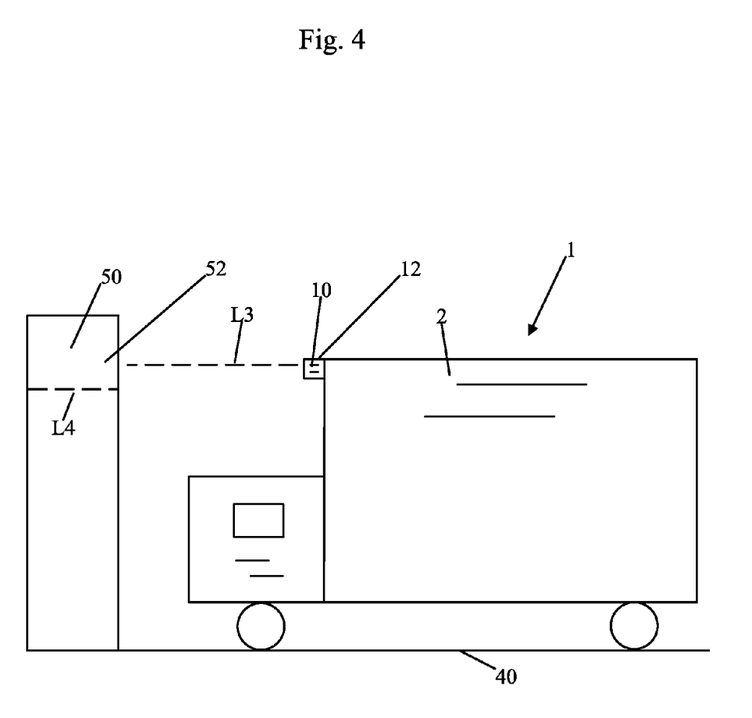
FIG. 4 shows a right view of the apparatus of FIG. 1 and the first structure, with the apparatus at a third location, with respect to the first structure.

FIG. 4 shows a right view of the apparatus 1 of FIG. 1 and the first structure 50, with the apparatus 1 at a third location, with respect to the first structure 50. In FIG. 4, the beam, such as an electromagnetic beam, of sensor device 12, is directed along line L3 and impacts with the horizontal structural beam 52 of first structure 50 and is returned to sensor device 12 and is sensed by sensor 204 of FIG. 11. The line L4 shown in dashed lines, indicates the lower edge of horizontal structural beam 52, below which there is open space for a vehicle to pass under structural beam 52 of first structure 50. Thus in FIG. 4, the sensor device 12, if in the "chime" or alarm" setting, will emit a chime sound or alarm sound, respectively, warning a driver of vehicle 2 that the vehicle 2 is too tall to pass under horizontal beam 52 of first structure 50.

Figure 5:
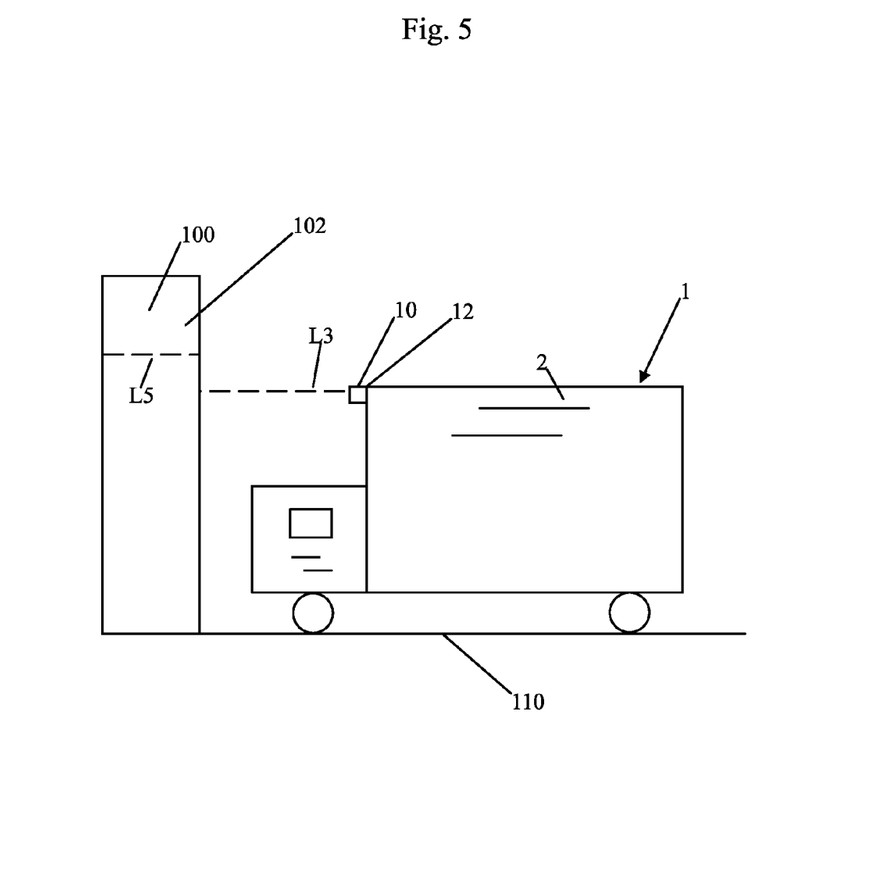
FIG. 5 shows a right view of the apparatus of FIG. 1 and a second structure under which vehicles having a height less than a second height can pass, with the apparatus at a fourth location, with respect to the second structure.

FIG. 5 shows a right view of the apparatus 1 of FIG. 1 and a second structure 100 under which vehicles having a height less than a second height, shown by line L5, can pass, with the apparatus 1 at a fourth location, with respect to the second structure 100. The vehicle 2 is shown on a road or surface 110. The line L3 of the beam of the sensor device 12, such as an electromagnetic beam, does not impact with the horizontal structural beam 102 and is not returned to sensor device 12. Thus the driver of vehicle 2, in FIG. 5, does not hear an alarm or chime from sensor device 12, and the driver of vehicle 2 knows that it is safe to pass under the horizontal structural beam 102 of the second structure 100.

Figure 6:
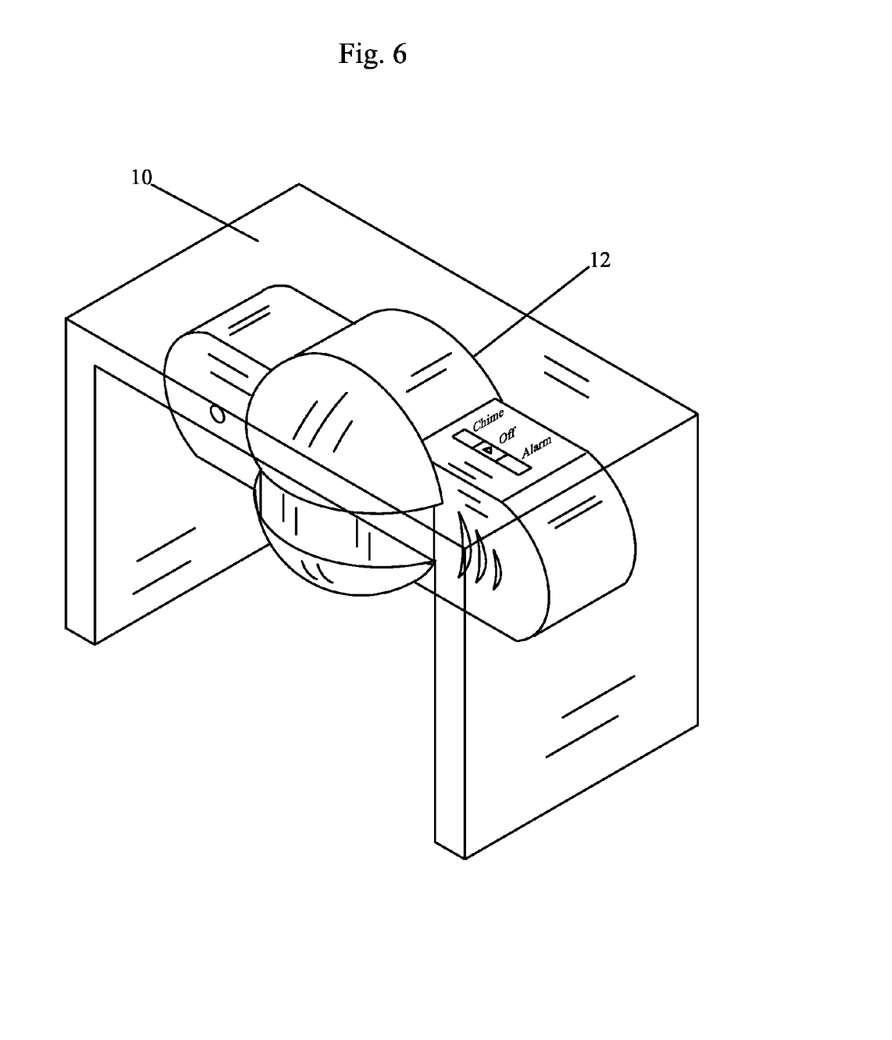
FIG. 6 shows a right, front, top perspective view of a housing and a known sensor device for use as part of the apparatus of FIG. 1 in accordance with an embodiment of the present invention, with the housing shown in a transparent format so that the sensor device can be seen.

FIG. 6 shows a right, front, top perspective view of the housing 10 and the known sensor 12 for use as part of the apparatus 1 of FIG. 1 in accordance with an embodiment of the present invention, with the housing 10 shown in a transparent format so that the sensor 12 can be seen. The sensor 12 may be mounted to the housing 10 in any known manner.

FIG. 7 shows the known sensor 12, also shown in FIG. 6, for use with the apparatus 1 of FIG. 1. The known sensor 12 includes a housing 12b, an LED indicator 12a, a sensor 12c, speaker openings 12d, a switch 12e, a switch channel 12f, a "Chime" indication 12g, an "Off" indication 12h, and an "Alarm" indication 12i. The switch 12e can be slid or set in the channel so that a triangle or pointer on switch 12e points to "Chime" 12g, "Off" 12h, or "Alarm" 12i, in order to set the switch 12e (or 206) as shown by FIGS. 7 and 11.

Figure 8A:
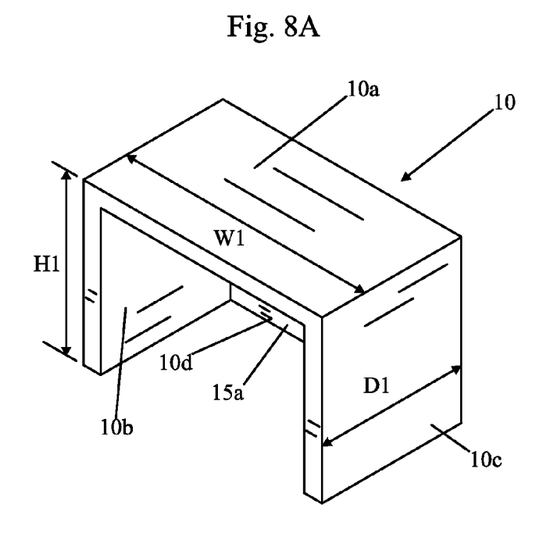
FIG. 8A shows a right, front, top perspective view of the housing shown in FIG. 6.
Figure 8B:
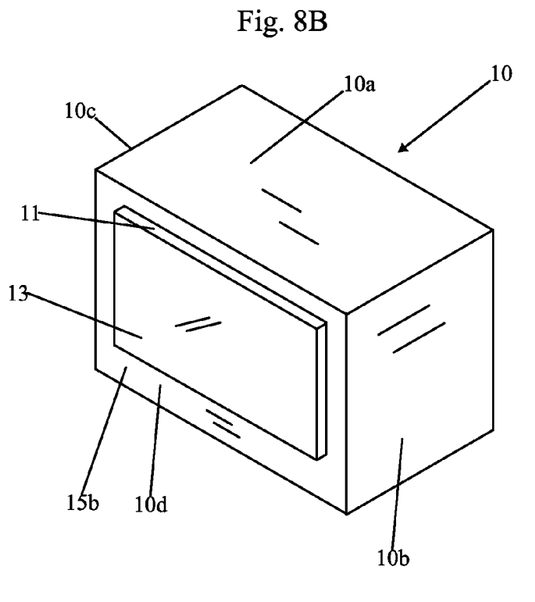
FIG. 8B shows a rear, bottom, and left perspective view of the housing shown in FIG. 6.
Figure 8C:
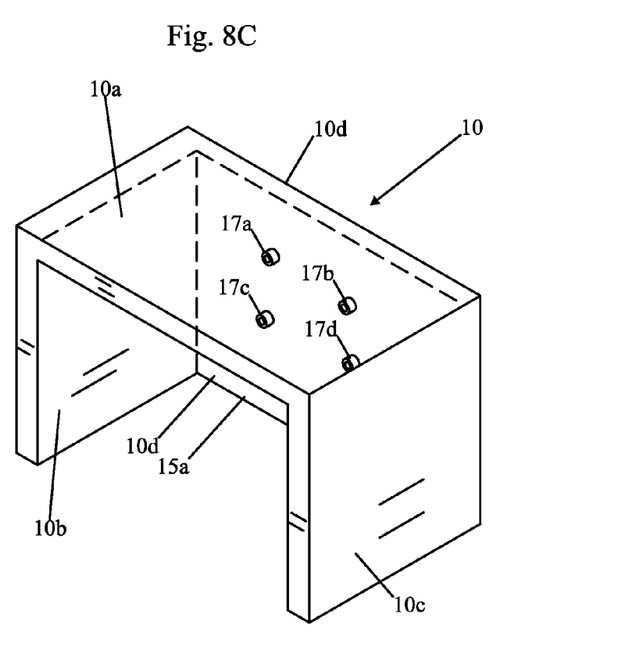
FIG. 8C shows a right, front, top perspective view of the housing shown in FIG. 6, with the housing shown in transparent format so that a plurality of protrusions can be seen.
Figure 8D:
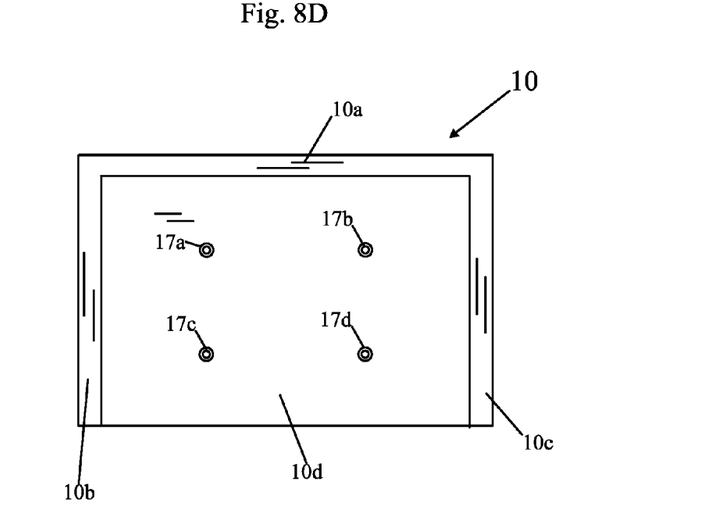
FIG. 8D shows a front view of the housing of FIG. 6.

FIG. 8A shows a right, front, top perspective view of the housing 10. FIG. 8B shows a rear, bottom, and left perspective view of the housing 10. FIG. 8C shows a right, front, top perspective view of the housing 10, with the housing 10 shown in transparent format so that a plurality of cylindrical protrusions 17a, 17b, 17c, and 17d can be seen. FIG. 8D shows a front view of the housing 10. The housing 10 may be made of an injection molded acrylonitrile butadiene styrene (ABS) plastic, or some other hard waterproof plastic. The housing 10 may include top 10a, side 10b, and side 10c, and rear 10d shown in FIG. 8A. The rear 10d may include a front surface 15a and a rear surface 15b. An adhesive pad 11 covered by a peel off paper 13 may be fixed to the rear surface 15b of the rear 10d as shown in FIG. 8B. The peel off paper 13 can be taken off to expose an adhesive surface of pad 11 which can be adhered to the vehicle 2 near the top surface 3a of the vehicle 2, as shown in FIG. 1.

The cylindrical protrusions 17a, 17b, 17c, and 17d, are not visible in the view of FIG. 8A unless the top 10a is transparent as shown in FIG. 8C. The cylindrical protrusions 17a-d, allow screws 80a, 80b, 80c, and 80d, respectively, to be inserted into openings of the protrusions 17a-d to allow attachment of the straps 70 and 72 as shown in FIG. 9.

Figure 9:
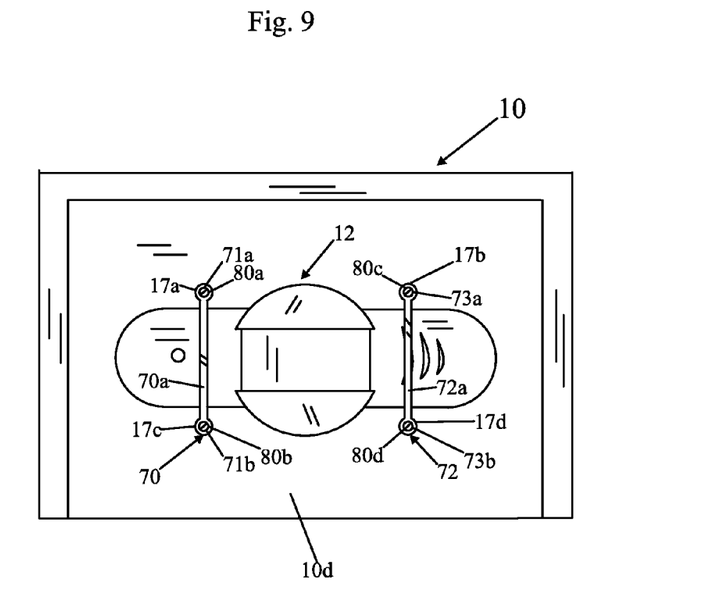
FIG. 9 shows a front view of the known sensor device of FIG. 7 attached to the housing of FIG. 8A-8D by two straps.
Figure 10:
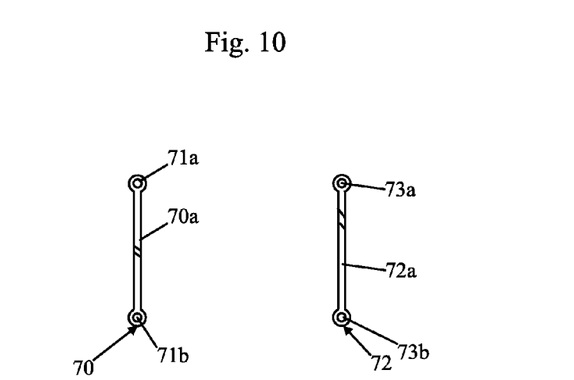
FIG. 10 shows a front view of the straps shown in FIG. 9.

FIG. 9 shows a front view of the known sensor 12 of FIG. 7 attached to the housing 10 of FIG. 8A-8D by two straps 70 and 72. The screws 80a-d are inserted through the openings 71a, 71b, 73a, and 73b, respectively, in order to fix the straps 70 and 72 to the housing 10 and to thereby mount and fix the sensor device 12 to the housing 10. FIG. 10 shows a front view of the straps 70 and 72 shown in FIG. 9.

The sensor device 12 may be a Radio Shack (trademarked) Motion-Sensing Door Chime/Alarm model number 4900426 as known in the art. The sensor device 12 may have a detection area of a thirty foot radius, such as along the center line L2, shown in FIG. 1. The battery 202 of FIG. 11 may be a nine volt battery.

The Alarm 210 when switched on, and when activated by an object in the path of the sensor 204 of FIG. 11 or sensor 12c of FIG. 7, may be configured to emit a piercing ninety DB (decibels) alarm sound. The LED indicator 12a may light up or flash when the battery 202 is low. The battery 202, and the speaker 214, and parts or all of switch 206, chime 208, alarm 210, sensor 204, and LED indicator 12a shown in FIG. 11, may be located inside the housing 12b shown in FIG. 7.

The sensor device 12 is self contained and requires no maintenance other than change of battery for battery 202, when necessary. The housing 10 keeps the sensor device 12 substantially dry by protecting the sensor device 12 from rain, snow, and debris, but allows a beam of sensor 12c to be emitted through the opening or empty area surrounded by top 10a, and sides 10b and 10c.

The housing 10 and thereby the sensor device 12 can be mounted to any vehicle and are preferably mounted at the highest point on the vehicle 2, shown in FIG. 1. The pad 11 at the back of the housing 10 shown in FIG. 8B is a pressure sensitive pad.

The sensor device 12 may be mounted to the housing 10 with the straps 70 and 72, with the switch 206 or 12e in the alarm position 12i so that the alarm 210 will go off when an object is in front of and in range of the sensor 12c of FIG. 7 or 204 of FIG. 11. The switch 12e (or 206) may only be switched off to 12h in FIG. 7 or 212 in FIG. 11, when an object, such as horizontal structural beam 52 of structure 50 enters the sensor 204 or 12c sensing area.

The top 10a may have a width W1 which may be about 5.6 inches, each of the sides 10b and 10c may have a height H1, which may be about four inches, as shown in FIG. 8A. Each of top 10a, and sides 10b and 10c, may have a depth D1 which may be about six inches.

The sensor device 12 and/or the sensors 12c and/or 204 may be a motion sensor. The sensor device 12, and/or sensors 12c or 204 may be a microwave motion sensor, radar motion sensor, or infrared energy motion sensor. The components 12, 12c, and/or 204 may be passive infrared detectors or pyroelectric sensors that detect changes in infrared energy. The components 12, 12c, and/or 204 may be common household light motion sensors or detectors. Motion sensors are typically configured to detect movement, such as for a burglar alarm. However in accordance with one or more embodiments of the present invention, a motion sensor, such as 12, 12c, and/or 204, detects that a horizontal structural beam, such as 52, has effectively entered into the path or beam of sensor device or sensor 12, 12c, and/or 204 when the vehicle 2 travels from, for example, location of FIG. 2 to the location of FIG. 3. Thus in accordance with at least one embodiment of the present invention, a known motion sensor is being used, not to detect the motion of an intruder, but to detect a fixed obstacle in the way of a moving vehicle.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
a sensor device having a top, a first side, a second side opposite the first side, a rear and a front;
a housing; and
means for temporarily attaching the sensor device to the housing in a manner such that the housing covers the top, the first side, and the second side of the sensor device but does not cover the front of the sensor device;
wherein the housing is adapted to be attached to an outside of a vehicle; and
wherein the means for temporarily attaching the sensor device to the housing include one or more straps.

2. The apparatus of claim 1 wherein
the sensor device is a portable and battery operated motion sensor.

3. The apparatus of claim 2 wherein
the motion sensor is an infrared motion sensor.

4. The apparatus of claim 1 further comprising
a speaker; and wherein
the sensor device is a portable and battery operated motion sensor, wherein the sensor device is configured to cause an audible warning to be emitted from the speaker when an obstacle effectively first enters a detection range of the sensor device by a change in relative position of the obstacle versus the sensor device.

5. The apparatus of claim 1 further comprising
the vehicle;
and wherein the housing is fixed substantially at a top of the vehicle.

6. The apparatus of claim 5 wherein
the sensor device is temporarily attached to the vehicle so that the sensor device emits an electromagnetic beam primarily directed parallel to a length of the vehicle;
and wherein the vehicle has a length, a height, and a width, and the length of the vehicle is greater than the height and the width.

7. The apparatus of claim 1 wherein
the sensor device has a one hundred degree range.

8. The apparatus of claim 1 wherein
the housing is substantially made of a hard waterproof plastic.

9. The apparatus of claim 1 wherein
the housing has a pressure sensitive adhesive pad attached to it for attaching the housing to the outside of the vehicle.

10. The apparatus of claim 1 wherein
the housing includes a rear;
wherein the housing includes one or more protrusions protruding from an inner surface of the rear of the housing away from the vehicle when the housing is fixed to the vehicle; and
wherein the one or more protrusions are configured to receive and retain one or more fasteners, respectively, without the one or more fasteners passing through the rear of the housing, in order to attach the one or more straps.

11. The apparatus of claim 10
wherein the one or more protrusions include first, second, third, and fourth protrusions;
wherein the one or more straps include first and second straps;
wherein the first, second, third, and fourth protrusions are spaced apart so that the sensor device when temporarily attached by the first and second straps to the housing, does not come in contact with the first, second, third, and fourth protrusions;

wherein the first strap has first and second ends;
wherein the second strap has first and second ends; and
wherein the sensor device is temporarily attached to the housing by the first and second ends of the first strap being connected to the first and second protrusions by first and second fasteners, respectively, and the first and second ends of the second strap being connected to the third and fourth protrusions by third and fourth fasteners, respectively, and with the first and second straps being spaced apart from each other.

12. A method comprising
temporarily attaching a sensor device to a housing in a manner such that the housing covers a top, a first side, and a second side of the sensor device but does not cover a front of the sensor device, wherein the sensor device includes the top, the first side, the second side which is opposite the first side, a rear and the front;
fixing the housing, while the sensor device is temporarily attached to the housing, substantially at the top of a vehicle so that an electromagnetic beam of the sensor device is primarily directed parallel to a length of the vehicle;
wherein the vehicle has a width and a height, and wherein the length is greater than the width and the height; and
wherein the sensor device is temporarily attached to the housing by one or more straps.

13. The method of claim 12 wherein
the sensor device is a portable and battery operated motion sensor, wherein the sensor device is configured to emit an audible warning from a speaker when an obstacle effectively first enters a detection range of the sensor device by a change in relative position of the obstacle versus the sensor device.

14. The method of claim 12 wherein
the sensor device has a one hundred degree range.

15. The method of claim 12 wherein
the housing has a pressure sensitive adhesive pad attached to it for attaching the housing to the outside of the vehicle.

16. The method of claim 12 wherein
the housing includes a rear;
wherein the housing includes one or more protrusions protruding from an inner surface of the rear of the housing away from the vehicle when the housing is fixed to the vehicle; and
wherein the one or more protrusions are configured to receive and retain one or more fasteners, respectively, without the one or more fasteners passing through the rear of the housing, in order to attach the one or more straps to the housing.

17. The method of claim 16
wherein the one or more protrusions include first, second, third, and fourth protrusions;
wherein the one or more straps include first and second straps;
wherein the first, second, third, and fourth protrusions are spaced apart so that the sensor device, when temporarily attached by the first and second straps to the housing, does not come in contact with the first, second, third, and fourth protrusions;
wherein the first strap has first and second ends;
wherein the second strap has first and second ends; and
wherein the sensor device is temporarily attached to the housing by the first and second ends of the first strap being connected to the first and second protrusions by first and second fasteners, respectively, and the first and second ends of the second strap being connected to the third and fourth protrusions by third and fourth fasteners, respectively, and with the first and second straps being spaced apart from each other.

* * * * *